US012749876B2

(12) United States Patent
Yaguchi

(10) Patent No.: US 12,749,876 B2
(45) Date of Patent: Sep. 29, 2026

(54) DEVICE AND METHOD FOR FORMING A NOTCH FOR STRIPPING WIRES

(71) Applicant: Yazaki Corporation, Tokyo (JP)

(72) Inventor: Naoya Yaguchi, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 274 days.

(21) Appl. No.: 18/676,623

(22) Filed: May 29, 2024

(65) Prior Publication Data

US 2025/0007259 A1 Jan. 2, 2025

(30) Foreign Application Priority Data

Jun. 30, 2023 (JP) ................................ 2023-107842

(51) Int. Cl.
*H02G 1/12* (2006.01)
*G01V 3/02* (2006.01)

(52) U.S. Cl.
CPC ............. *H02G 1/1256* (2013.01); *G01V 3/02* (2013.01); *H02G 1/1265* (2013.01); *H02G 1/127* (2013.01)

(58) Field of Classification Search
CPC .... H02G 1/1256; H02G 1/1265; H02G 1/127; G01V 3/02
See application file for complete search history.

(56) References Cited

U.S. PATENT DOCUMENTS 4,745,828 A * 5/1988 Stepan .................... G02B 6/245 81/9.42
4,993,287 A * 2/1991 Carpenter ............ H02G 1/1295 81/9.51
5,243,882 A * 9/1993 Stepan ................. H02G 1/1265 81/9.42
5,361,653 A * 11/1994 Pradin .................. H02G 1/1265 81/9.51
5,653,016 A * 8/1997 Hoffa ................... H02G 1/1256 81/9.51
11,705,699 B2 * 7/2023 Okazaki ............... H02G 1/1265 83/870
12,525,772 B2 * 1/2026 Yaguchi ............... H02G 1/1253
2020/0076148 A1 * 3/2020 Houser ................ H02G 1/1297
2020/0412114 A1 * 12/2020 Sugawara .............. H02G 1/005
(Continued)

FOREIGN PATENT DOCUMENTS

JP 2000-350324 A 12/2000
JP 2000354315 A * 12/2000
(Continued)

*Primary Examiner* — Ryan J. Walters
(74) *Attorney, Agent, or Firm* — Sughrue Mion, PLLC

(57) ABSTRACT

A device for forming a notch for stripping includes a cutting mechanism which includes an electrically conductive cutter blade; a contact detecting section for detecting contact between an outermost conductor of the coated electric wire and the cutter blade based on a variable capacitance between the outermost conductor and the cutter blade; and a movement mechanism for adjusting a position of the cutter blade and thus positioning the cutter blade to a position corresponding to a specified notch depth for forming the notch, upon detecting the contact between the cutter blade and the outermost conductor by the contact detecting section during movement of the cutter blade.

6 Claims, 9 Drawing Sheets

(56) References Cited

U.S. PATENT DOCUMENTS

| | | | | |
|---|---|---|---|---|
| 2021/0119426 | A1* | 4/2021 | Backenstoes | B26D 5/16 |
| 2021/0296866 | A1* | 9/2021 | Okazaki | H02G 1/1265 |
| 2022/0239078 | A1* | 7/2022 | Sorg | H02G 1/127 |
| 2025/0015571 | A1* | 1/2025 | Yaguchi | H02G 1/1265 |

FOREIGN PATENT DOCUMENTS

| | | | | | |
|---|---|---|---|---|---|
| JP | 2021151108 | A | * | 9/2021 | H02G 1/1268 |
| WO | WO-2013183120 | A1 | * | 12/2013 | H02G 1/1256 |

* cited by examiner

DEVICE AND METHOD FOR FORMING A NOTCH FOR STRIPPING WIRES

BACKGROUND OF THE INVENTION

Technical Field

The present invention relates to a device and a method for forming a notch for stripping in which the notch is formed starting from an outer circumferential surface of a coated electric wire for stripping the coated electric wire.

Background Art

As one of conventional processes for processing terminals of coated electric wires, a stripping process is widely used in which a coating is removed to expose an internal conductor such as a core. Furthermore, a device for forming a notch for the stripping is known which forms a notch in the coated electric wire starting from its outer circumferential surface to make a stripped region removable (see e.g. Patent Document 1). Such a type of device for forming a notch for stripping according to Patent Document 1 includes a pair of V-shaped cutter blades which is configured to clamp a coated electric wire therebetween so as to intrude into the outer circumferential surface and to be then rotated around an electric wire axis of the coated electric wire in order to form the notch for stripping.

CITATION LIST

Patent Literature

Patent Document 1: JP 2000-350324 A

SUMMARY OF THE INVENTION

Coated electric wires include a thick electric wire which includes a plurality of layers of coating materials arranged around a core and layered on each other, such as an inner coating, a braid, a metal foil, and an outer coating. In many cases, this type of device for forming a notch for stripping is configured such that the electric wire axis is used as a reference for movement of the V-shaped cutter blades to clamp the coated electric wire by the V-shaped cutter blades, wherein target positions to be reached by the V-shaped cutter blades are determined as a distance from the electric wire axis. Then, the V-shaped cutter blades are moved toward the electric wire axis to clamp the coated electric wire so that the V-shaped cutter blades intrude into it to a notch depth corresponding to the determined target positions. For example, in the case of forming a notch in a thick electric wire as mentioned above, the target positions for the V-shaped cutter blades are determined as a distance from the electric wire axis which is obtained by subtracting a thickness of a coating material to be removed from a sum of a radius of a core and individual thicknesses of the plurality of layers of coating materials. In the case of a thick electric wire, a tolerance in the target positions for the V-shaped cutter blades with the electric wire axis as the reference tend to be large because this tolerance is an accumulated tolerance obtained from a tolerance of the core radius and a tolerance of a thickness of a coating material(s) which is different from the removed coating material. This may result in a low accuracy for movement of the V-shaped cutter blades. For example, in the case of forming a notch in a thick electric wire to a desired coating material included therein, the notch may be formed to a too large depth due to a low accuracy for movement of the V-shaped cutter blades so that the notch may extend into a more inner coating material to be kept untouched. A too shallow notch may be also formed so that the notch may be insufficient for stripping.

Furthermore, many of coated electric wires are wound around bobbins for storage. During such storage, the core and/or coating may be deformed and flattened due to load by the own weight, or misalignment may occur in which the electric wire axis may be offset from a center of the coated electric wire. When notch forming is applied to a coated electric wire with such deformation and/or misalignment by the above type of device for forming a notch for stripping, rotation of the pair of V-shaped cutter blades around the electric wire axis may result in a varying notch depth obtained by the cutter blades in a direction around the electric wire axis. As a result, the obtained notch may be too deep in some region along the direction around the electric wire axis so that a more inner portion to be untouched may be cut in, wherein the notch may be too shallow in some other region along the direction around the electric wire axis so that the electric wire may be cut in only insufficiently.

Thus, the above-mentioned type of device for forming a notch for stripping, namely a device with a pair of V-shaped cutter blades which clamp a coated electric wire and are then rotated around the electric wire axis, has the problem that an accuracy for notch forming may be reduced when forming a notch in a thick electric wire and a coated electric wire wound around a bobbin for storage.

Therefore, the present invention is focused on the above problem, and an objective of the present invention is to provide a device and a method for forming a notch for stripping which enables an accuracy for notch forming to be improved in the case of forming a notch in a thick electric wire and/or a coated electric wire wound around a bobbin for storage.

In order to achieve the above-mentioned objective, a device for forming a notch for stripping includes: one or more cutting mechanisms including one or more mechanism parts, with one of the one or more mechanism parts being associated to each of the one or more cutting mechanisms, wherein the one or more mechanism parts are configured to be arranged around an electric wire axis of a coated electric wire, wherein the coated electric wire includes a core covered with an insulating layer or covered with the insulating layer and one or more conductive layers, wherein the one or more conductive layers are layered inside the insulating layer, wherein each of the one or more cutting mechanisms is configured to form one or more notches in the coated electric wire to a specified notch depth starting from an outer circumferential surface of the coated electric wire by means of a respective one of the one or more mechanism parts; and a rotation mechanism configured to rotate the one or more mechanism parts around the electric wire axis and thus extend the one or more notches in a direction around the electric wire axis in a state of the one or more mechanism parts which have formed the one or more notches in the coated electric wire, which makes a stripped region corresponding to the notch depth removable, wherein each of the one or more cutting mechanisms includes: an electrically conductive cutter blade which is movable in an intersection direction intersecting the outer circumferential surface; a contact detecting section configured to detect a contact between an outermost conductor and the cutter blade based on a variable capacitance between the outermost conductor and the cutter blade, wherein the outermost conductor is located at a smallest depth from the outer circumferential surface in the coated electric wire and the variable capacitance depends on movement of the cutter blade; and a movement mechanism forming a respective one of the one or more mechanism parts together with the cutter blade, the movement mechanism being configured to move the cutter blade in the intersection direction, wherein upon detecting the contact by the contact detecting section during movement of the cutter blade, the movement mechanism is configured to adjust a position of the cutter blade in the intersection direction and position the cutter blade to a position corresponding to the notch depth for forming one or more notches therein.

In order to achieve the above-mentioned objective, the present invention also provides a method for forming a notch for stripping including: a preparation step of placing the coated electric wire in the device as described above and positioning the cutter blade in an initial position by means of the device, wherein the initial position is spaced away from the outer circumferential surface in the intersection direction; a first notch forming step of moving the cutter blade until the contact between the outermost conductor and the cutter blade is detected by the contact detecting section based on the variable capacitance; upon detecting the contact by the contact detecting section during movement of the cutter blade according to the first notch forming step, a second notch forming step of adjusting the position of the cutter blade in the intersection direction and positioning the cutter blade to a position corresponding to the notch depth for forming one or more notches therein; and a rotation step of rotating the one or more mechanism parts around the electric wire axis and thus extending the one or more notches in the direction around the electric wire axis in the state of the one or more mechanism parts which have formed the one or more notches in the coated electric wire, which makes the stripped region corresponding to the notch depth removable.

With the device and method for forming a notch for stripping, it is possible to improve the accuracy for notch forming in the case of forming a notch in a thick electric wire and/or a coated electric wire wound around a bobbin for storage.

DETAILED DESCRIPTION OF PREFERRED EMBODIMENTS

Hereinafter, embodiments of a device and a method for forming a notch for stripping will be described.

Figure 1:
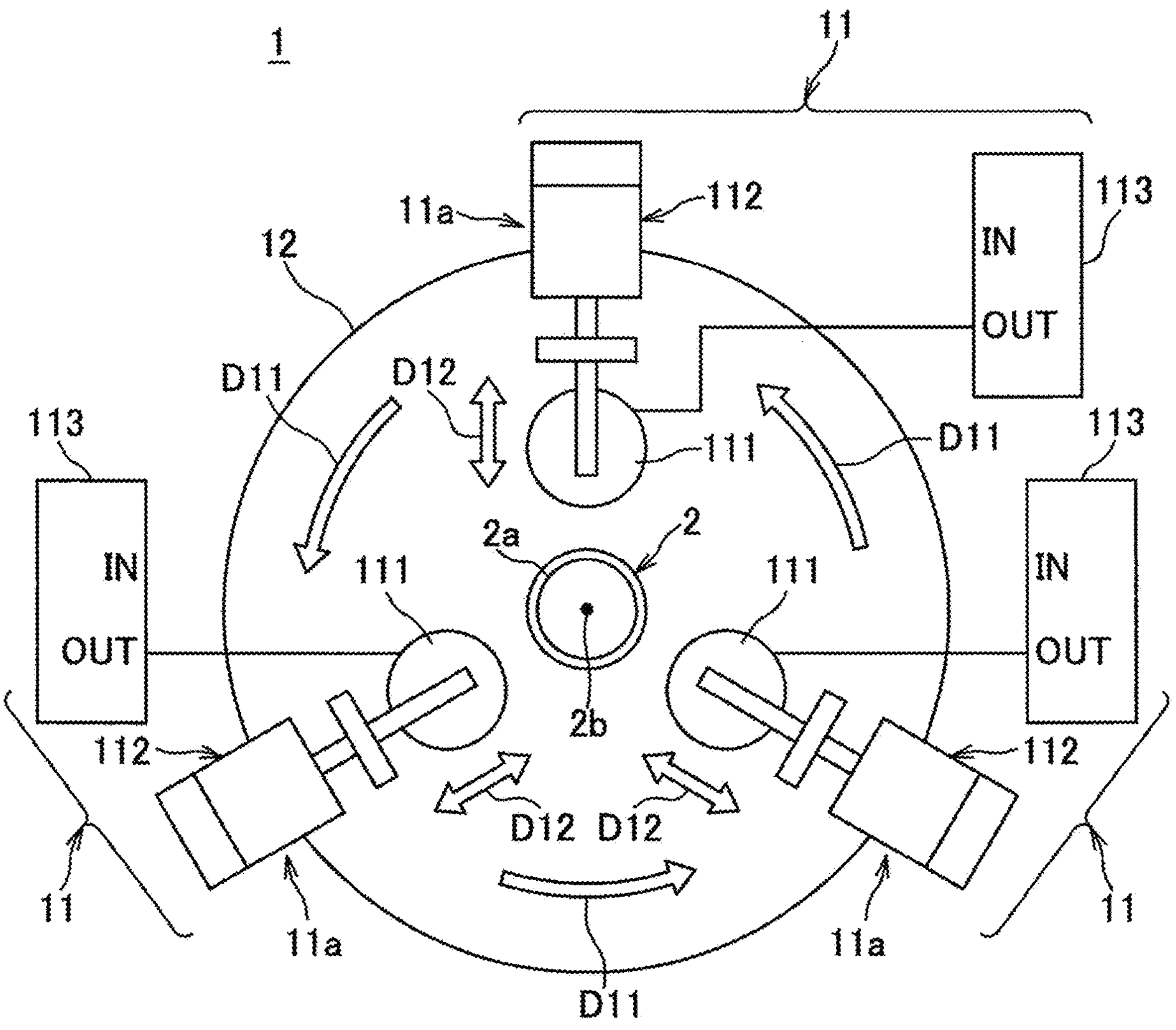
FIG. 1 shows a schematic view of a device for forming a notch for stripping according to an embodiment.
Figure 2:
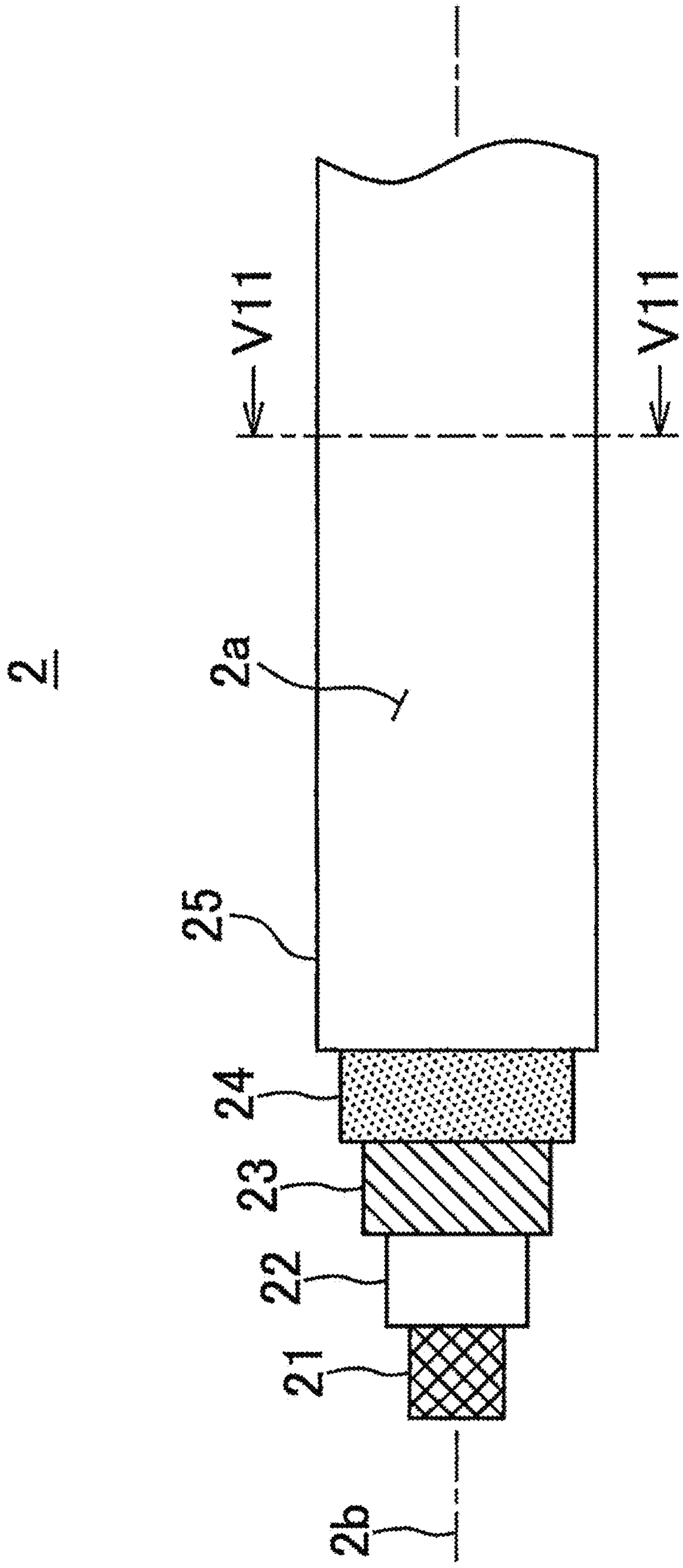
FIG. 2 shows a schematic view of a coated electric wire to which notch forming may be applied by the device for forming a notch for stripping as shown in FIG. 1.
Figure 3:
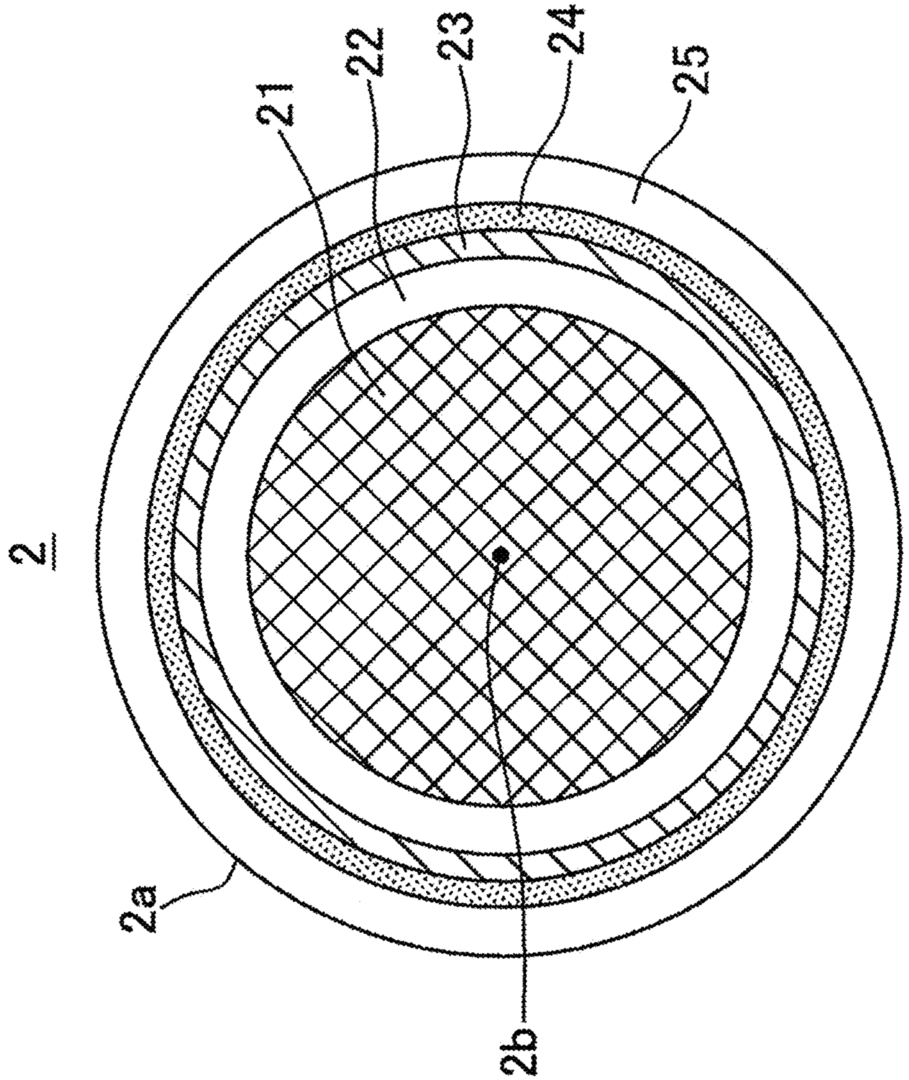
FIG. 3 shows a sectional view of the coated electric wire according to FIG. 2 along the line V11-V11 as shown in FIG. 2.

FIG. 1 shows a schematic view of a device for forming a notch for stripping according to an embodiment. FIG. 2 shows a schematic view of a coated electric wire to which notch forming may be applied by the device for forming a notch for stripping as shown in FIG. 1, and FIG. 3 shows a sectional view of the coated electric wire according to FIG. 2 along the line V11-V11 as shown in FIG. 2. First, a coated electric wire 2 for which notch forming is applied according to the present embodiment is a thick electric wire including a plurality of layers of coating materials and a conductive core 21 covered with the plurality of layers of coating materials. This coated electric wire 2 is wound around a bobbin for storage and used e.g. for a high-voltage wire harness for an automobile. As the coating materials, the coated electric wire 2 includes an inner coating 22 made of an insulating resin as an insulating layer, a braid 23 as a conductive layer, a metal foil 24 as a conductive layer, and an outermost coating 25 made of an insulating resin as an insulating layer. For processing a terminal of the coated electric wire 2, the device 1 for forming a notch for stripping is configured to form one or more notches to a specified notch depth starting from an outer circumferential surface 2*a* of the coated electric wire 2, whereby a stripped region corresponding to the notch depth is removable.

For example, notch forming as described below is possible: For example, a notch forming process is possible in which a depth extending to an inner circumference of the metal foil 24 is specified as the notch depth so that the outermost coating 25 and the metal foil 24 are defined as the stripped region, wherein one or more notches extending to the inner circumference of the metal foil 24 are formed. In this example, after stripping, the braid 23 will be exposed at a terminal of the coated electric wire 2, the braid 23 accommodating the inner coating 22 and core 21 therein. Furthermore, as another example, a notch forming process is possible in which a depth extending to an inner circumference of the inner coating 22 is specified as the notch depth so that all coating materials other than the core 21 are defined as the stripped region, wherein one or more notches extending to the inner circumference of the inner coating 22 are formed. In this example, after stripping, the core 21 will be exposed at the terminal of the coated electric wire 2.

The device 1 for forming a notch for stripping is capable of forming such a notch in the coated electric wire 2, and includes three cutting mechanisms 11 and a rotation mechanism 12. The cutting mechanisms 11 include a plurality of mechanism parts 11*a* (three mechanism parts 11*a* in the present embodiment) in a one-to-one manner, i.e., one of the mechanism parts 11*a* is associated to each of the cutting mechanisms 11, wherein the mechanism parts 11*a* are disposed around an electric wire axis 2*b* of the coated electric wire 2. The cutting mechanisms 11 are configured to form one or more notches to a specified notch depth starting from the outer circumferential surface 2*a* of the coated electric wire 2 by means of the respective mechanism parts 11*a*. In the present embodiment, the three mechanism parts 11*a* of the cutting mechanisms 11 are arranged and spaced from each other at an angle of 120° around the electric wire axis 2*b*. The rotation mechanism 12 is configured to rotate the three mechanism parts 11*a* in a cutting rotating direction D11 around the electric wire axis 2*b* and thus extend the one or more notches in the cutting rotating direction D11 around the electric wire axis 2*b* in a state of the mechanism parts 11*a* which have formed the one or more notches in the coated electric wire 2. In the present embodiment, the rotation mechanism 12 rotates the three cutting mechanisms 11 by an angle greater than or equal to 120° in the cutting rotating direction D11 around the electric wire axis 2*b*. This rotation connects the notches at three locations in the direction around the electric wire axis 2*b* to obtain one notch extending over the entire circumference of the coated electric wire 2, whereby the stripped region corresponding to the specified notch depth is removable.

In the device 1 for forming a notch for stripping, the three cutting mechanisms 11 are configured identically, including the mechanism parts 11*a*. Hereinafter, configuration of the cutting mechanisms 11 will be described with respect to one of the cutting mechanisms 11.

Figure 4:
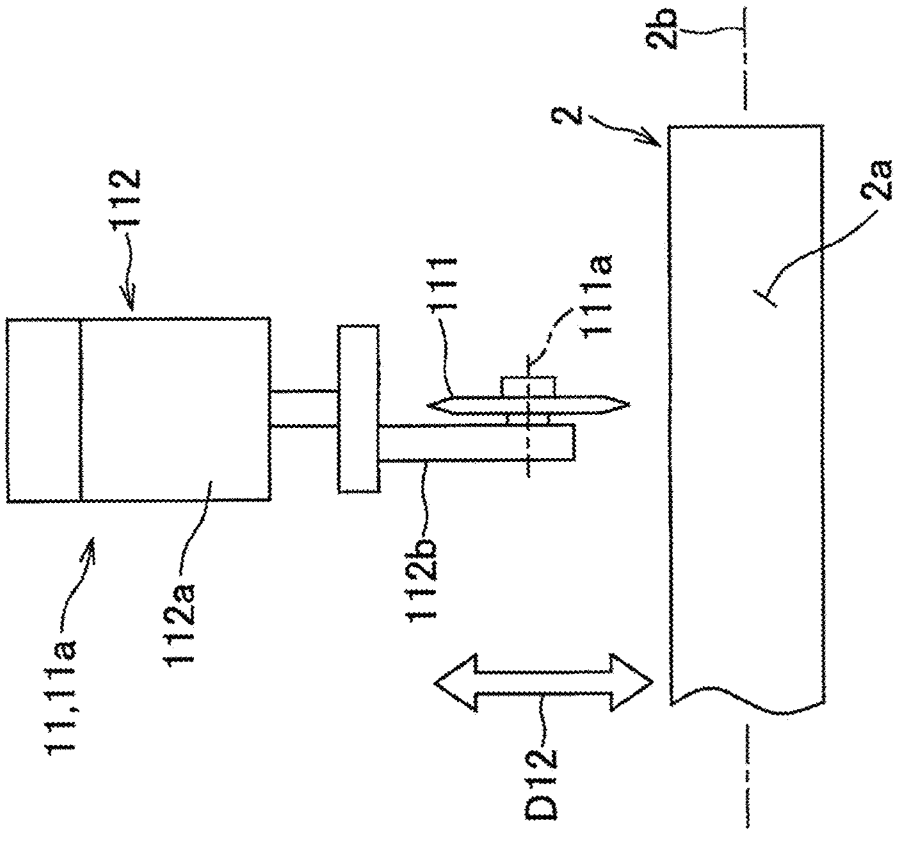
FIG. 4 shows a schematic side view of a mechanism part of a cutting mechanism according to FIG. 1 as viewed in a cutting rotating direction.

FIG. 4 shows a schematic side view of a mechanism part of a cutting mechanism according to FIG. 1 as viewed in a cutting rotating direction.

As shown in FIGS. 1 and 4, the cutting mechanism 11 includes a cutter blade 111, a movement mechanism 112, and a contact detecting section 113, the cutter blade 111 and movement mechanism 112 forming a mechanism part 11*a*, wherein the contact detecting section 113 is configured to detect contact between an outermost conductor and the cutter blade 111, wherein the outermost conductor is located at a smallest depth from the outer circumferential surface 2*a* in the coated electric wire 2. In the present embodiment in which notch forming is applied to the coated electric wire 2 as shown in FIGS. 2 and 3, the outermost conductor is the metal foil 24.

The cutter blade 111 is an electrically conductive and disc-shaped cutting element which is movable in an intersection direction D12 intersecting the outer circumferential surface 2*a* of the coated electric wire 2. According to the present embodiment, the movement mechanism 112 includes a cutter frame 112*b* as described below, wherein the cutter blade 111 is mounted to the cutter frame 112*b* such that the cutter blade 111 is pivotable around a cutter axis 111*a* which extends along the electric wire axis 2*b* and intersects the intersection direction D12.

The movement mechanism 112 is configured to move the cutter blade 111 in the intersection direction D12. Furthermore, when contact between the cutter blade 111 and the metal foil 24 is detected by the contact detecting section 113 during movement of the cutter blade 111, the movement mechanism 112 adjusts a position of the cutter blade 111 in the intersection direction D12 and positions the cutter blade 111 to a position corresponding to the notch depth for forming a notch in the coated electric wire 2. The movement mechanism 112 according to the present embodiment includes a servo motor 112*a* as a driving source, wherein the servo motor 112*a* is capable of precise driving. Furthermore, the movement mechanism 112 includes a cutter coupling frame 112*b* which is driven by the servo motor 112*a* in the intersection direction D12, wherein the cutter blade 111 is pivotably mounted to a tip end of the cutter coupling frame 112*b* facing the coated electric wire 2. The movement mechanism 112 moves the cutter blade 111 precisely by means of the servo motor 112*a* through the cutter coupling frame 112*b* to move the cutter blade 111 into the outer circumferential surface 2*a* of the coated electric wire 2 to the specified notch depth.

As described above, the contact detecting section 113 is configured to detect contact of the cutter blade 111 with the metal foil 24, wherein this contact detection is performed based on a variable capacitance between the metal foil 24 and the cutter blade 111 which depends on movement of the cutter blade 111.

Figure 5:
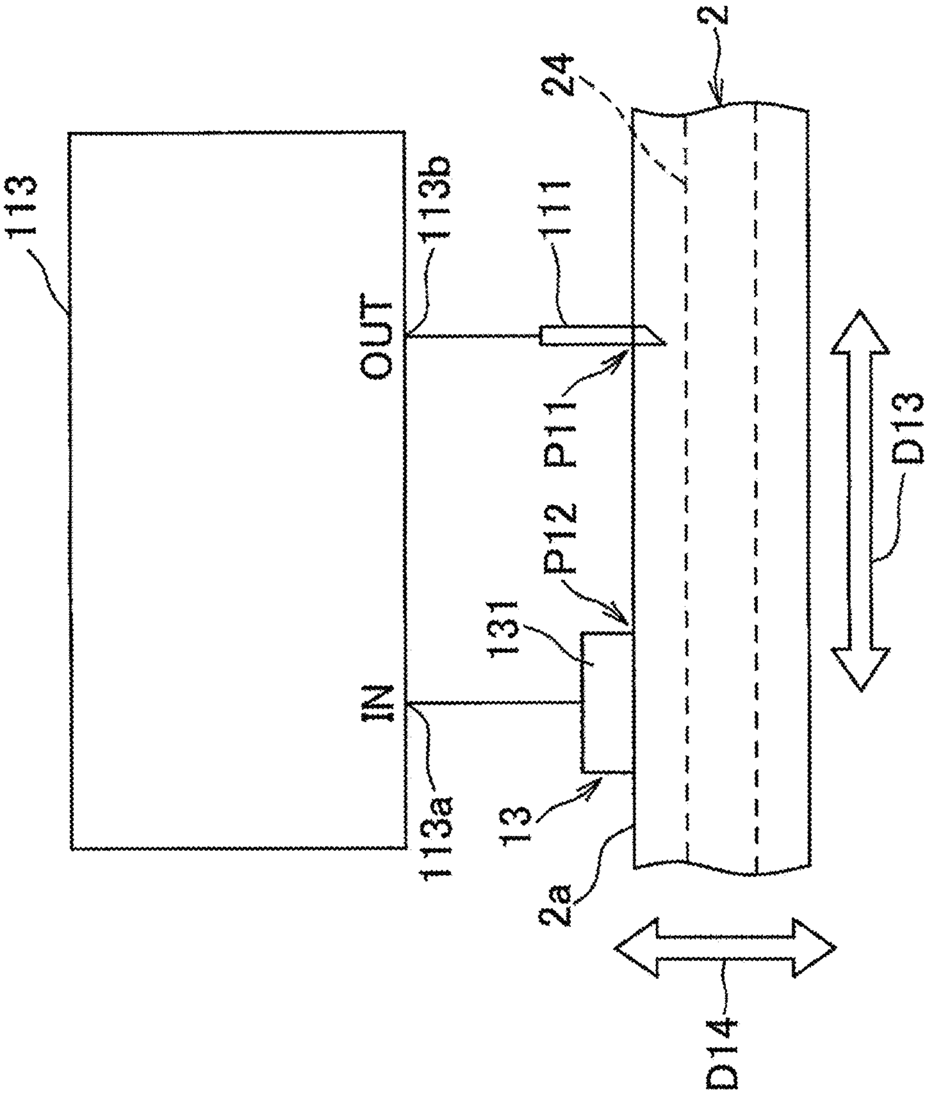
FIG. 5 schematically shows how a contact detecting section according to FIG. 1 detects contact of cutter blades with a metal foil based on a variable capacitance between the metal foil and the cutter blades.
Figure 6:
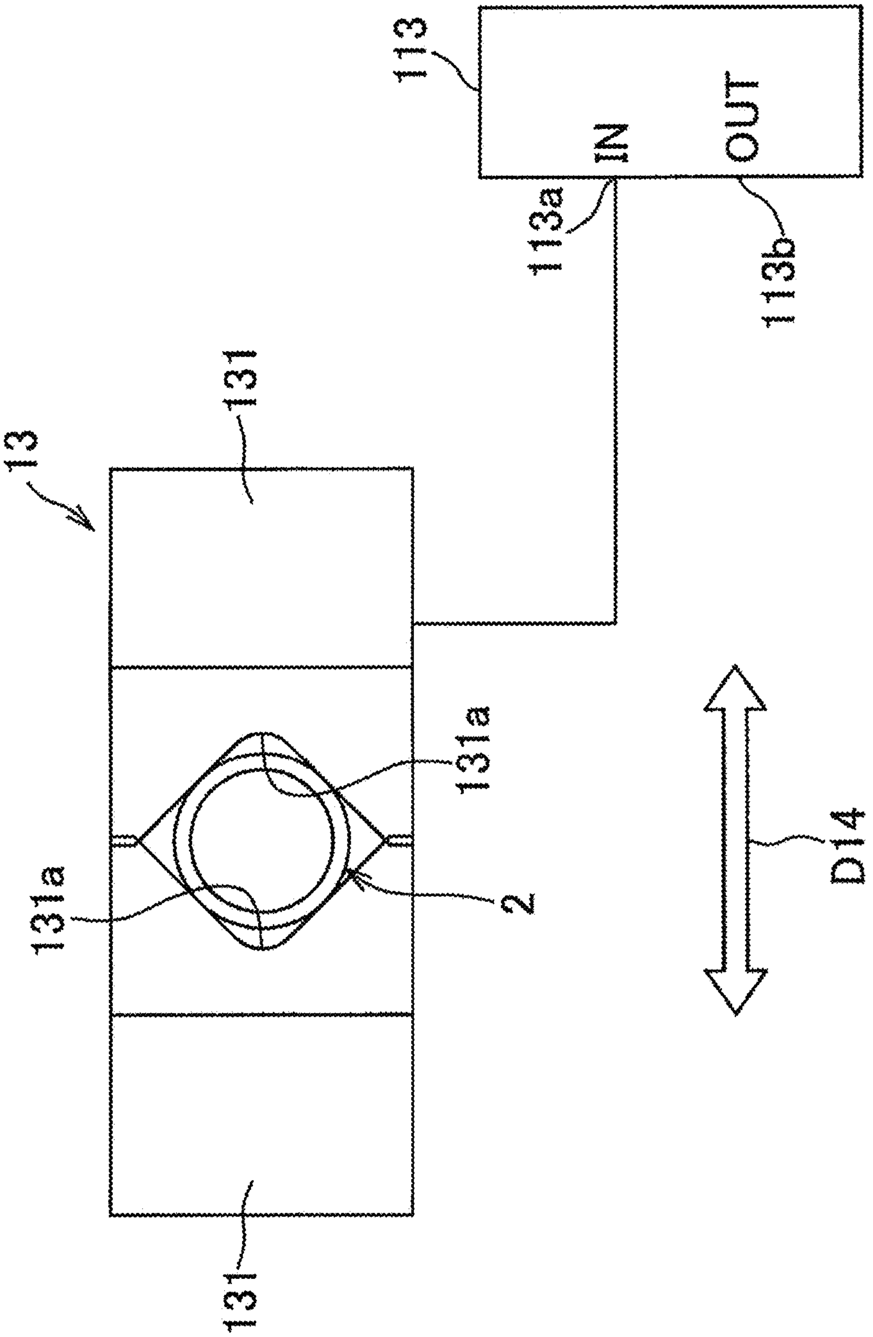
FIG. 6 schematically shows a clamping part according to FIG. 5.
Figure 7:
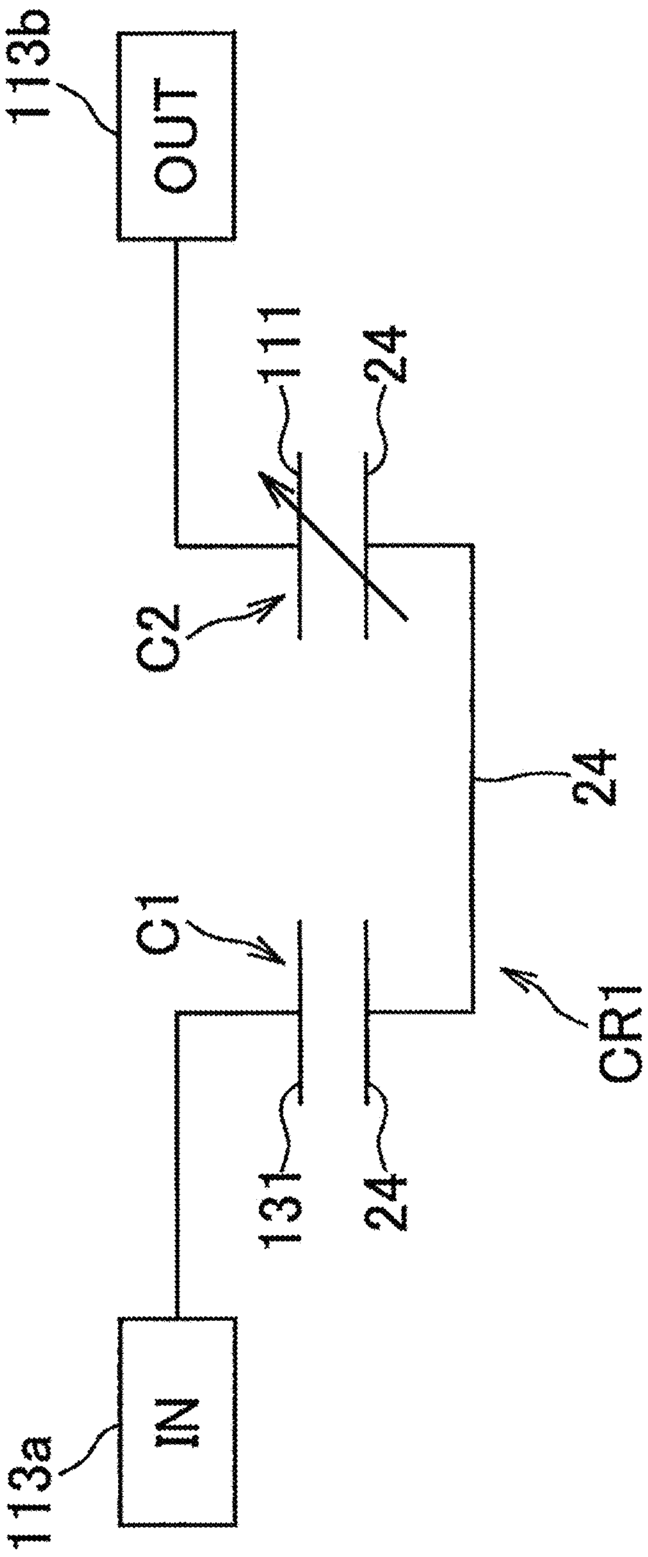
FIG. 7 shows a schematic circuit diagram illustrating configuration for contact detection of the cutter blades according to FIG. 5.

FIG. 5 schematically shows how a contact detecting section according to FIG. 1 detects contact of cutter blades with a metal foil based on the variable capacitance between the metal foil and the cutter blades. FIG. 6 schematically shows a clamping part according to FIG. 5, and FIG. 7 shows a schematic circuit diagram illustrating configuration for contact detection of the cutter blades according to FIG. 5.

The clamping part 13 is an electrically conductive element configured to hold the coated electric wire 2 by contacting the outer circumferential surface 2*a* in a clamping position P12, the clamping position P12 being spaced away from a notch forming position P11 of the cutter blade 111 in the length direction D13 of the coated electric wire 2. One clamping part 13 is provided for the three cutting mechanisms 11 and configured to use a pair of clamping elements 131 to hold and clamp the coated electric wire 2 in its radial direction D14 as shown in FIG. 6, wherein both the clamping elements 131 are electrically conductive. Each of the clamping elements 131 has an electric wire receiving recess 131*a* formed on a side facing the coated electric wire 2, wherein the electric wire receiving recess 131*a* is recessed in a V-shape. The pair of clamping elements 131 hold the coated electric wire 2 by receiving it inside the electric wire receiving recesses 131*a* so that the clamping elements 131 come into contact with the outer circumferential surface 2*a* of the coated electric wire 2 on inner surfaces of the electric wire receiving recesses 131*a*.

As described above, each of the cutter blades 111 of the three cutting mechanisms 11 and the pair of clamping elements 131 forming the clamping part 13 is electrically conductive. One of the pair of clamping elements 131 is connected to an IN-terminal 113*a* of the contact detecting section 113 of each of the three cutting mechanisms 11, wherein the cutter blade 111 of each of the cutting mechanisms 11 is connected to an OUT-terminal 113*b* of a corresponding contact detecting section 113. With such connection, a clamping-side capacitor C1 is formed between the clamping element 131 of the clamping part 13 connected to the IN-terminal 113*a* and the metal foil 24 which is the outermost conductor in the coated electric wire 2. Since a distance between the clamping element 131 and the metal foil 24 does not vary during clamping, a capacitance of the clamping-side capacitor C1 is a fixed capacitance which has a substantially constant value. On the other hand, a cutter-side capacitor C2 is formed between the cutter blade 111 and the metal foil 24, wherein a capacitance of the cutter-side capacitor C2 is a variable capacitance which has a value varying by movement of the cutter blade 111 and by the resulting change in the distance to the metal foil 24. When the cutter blade 111 is in contact with the metal foil 24, the variable capacitance has a value of substantially zero. According to the present embodiment, an electric circuit CR1 is formed by the IN-terminal 113*a* and OUT-terminal 113*b* of the contact detecting section 113, clamping-side capacitor C1, cutter-side capacitor C2, and the metal foil 24 between the two capacitors. The contact detecting section 113 applies an AC voltage between electrodes formed by the cutter blade 111 and the clamping element 131 of the clamping part 13 to detect the variable capacitance in the cutter-side capacitor C2, wherein the AC voltage is applied between the electrodes via the IN-terminal 113*a* and OUT-terminal 113*b*. Based on a result of the detection, more specifically upon the variable capacitance of the cutter-side capacitor C2 having a value of zero, the contact detecting section 113 detects contact between the cutter blade 111 and the metal foil 24.

When the contact is detected by the contact detecting section 113 during movement of the cutter blade 111, the movement mechanism 112 of each cutting mechanism 11 adjusts the position of the cutter blade 111 in the intersection direction D12 to position the cutter blade 111 to the position corresponding to the specified notch depth. In the case of the specified notch depth extending to the metal foil 24, this means that the movement mechanism 112 stops movement of the cutter blade 111 at the time of detecting the contact. On the other hand, in the case of the specified notch depth extending to the braid 23, the movement mechanism 112 will stop movement of the cutter blade 111 when the cutter blade 111 has been forwarded over a distance corresponding a thickness of the metal foil 24 after the time of detecting the contact. In the case of the notch depth extending to the inner coating 22, the movement mechanism 112 will stop movement of the cutter blade 111 when the cutter blade 111 has been forwarded over a distance corresponding a sum of thicknesses of the metal foil 24 and the braid 23 after the time of detecting the contact. In the case of the notch depth extending to the core 21, the movement mechanism 112 will stop movement of the cutter blade 111 when the cutter blade 111 has been forwarded over a distance corresponding a sum of thicknesses of the metal foil 24, the braid 23 and the inner coating 22 after the time of detecting the contact. Once the notches have been thus formed to the specified notch depth at three locations with an interval of an angle of 120° around the electric wire axis 2*b* in the coated electric wire 2, the rotation mechanism 12 rotates the mechanism parts 11*a* including the cutter blades 111 by an angle greater than or equal to 120° around the electric wire axis 2*b*. With this rotation, the notches at the three locations are extended in the direction around the electric wire axis 2*b* to be connected to each other so that one notch is formed which extends over the entire circumference of the coated electric wire 2 in the direction around the electric wire axis 2*b*. This notch forming process may make the stripped region corresponding to the specified notch depth removable.

Next, a method for forming a notch for stripping will be described in which a notch for stripping is formed at a terminal of the coated electric wire 2 by using the device 1 for forming a notch for stripping as described above. Although the following description includes repetition of some of the above description, the following description will be made with reference to other figures.

Figure 8:
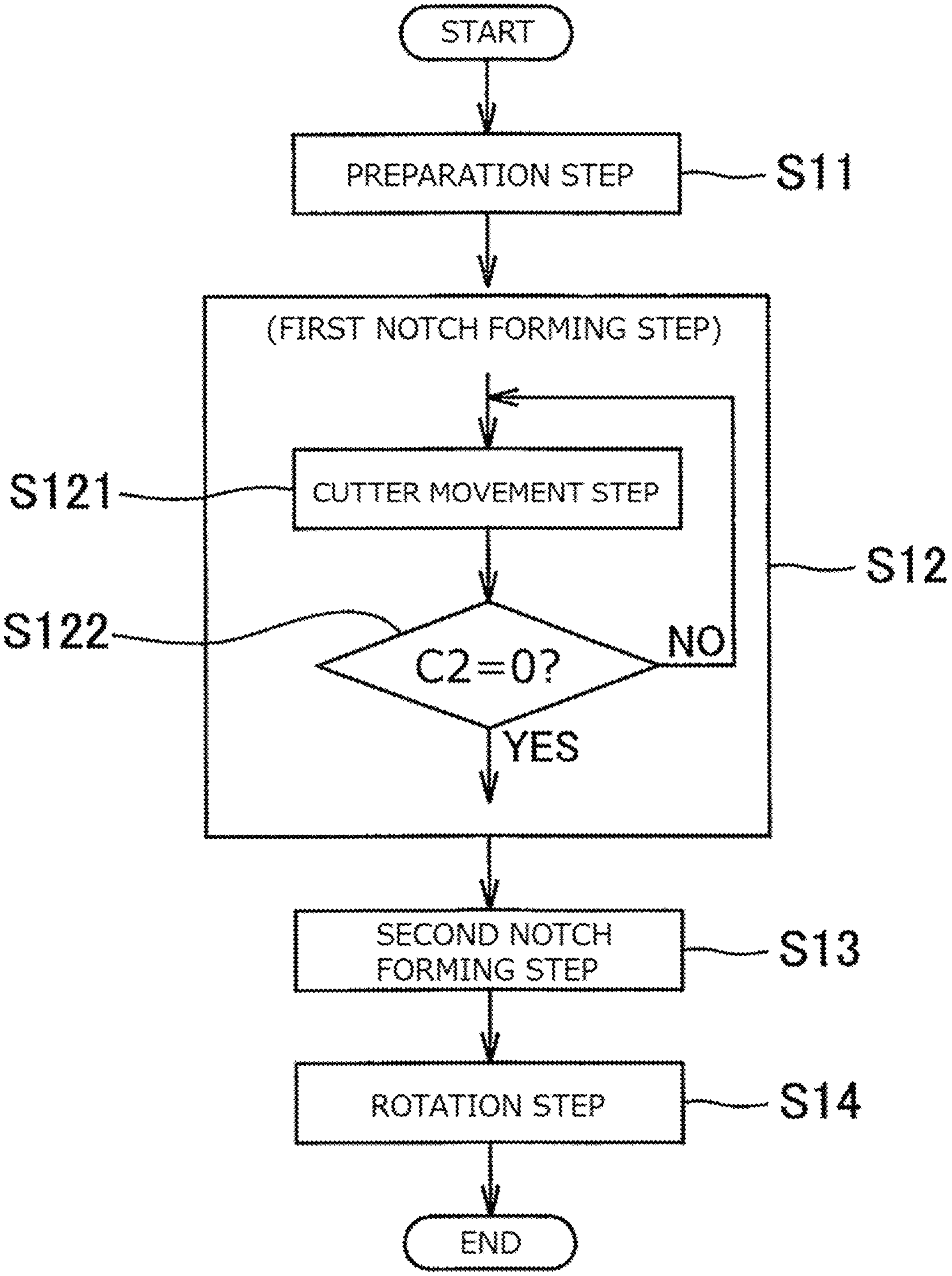
FIG. 8 shows a schematic flowchart illustrating a flow of a series of processes of a method for forming a notch for stripping at a terminal of a coated electric wire by means of the device for forming a notch for stripping as shown in FIG. 1.
Figure 9:
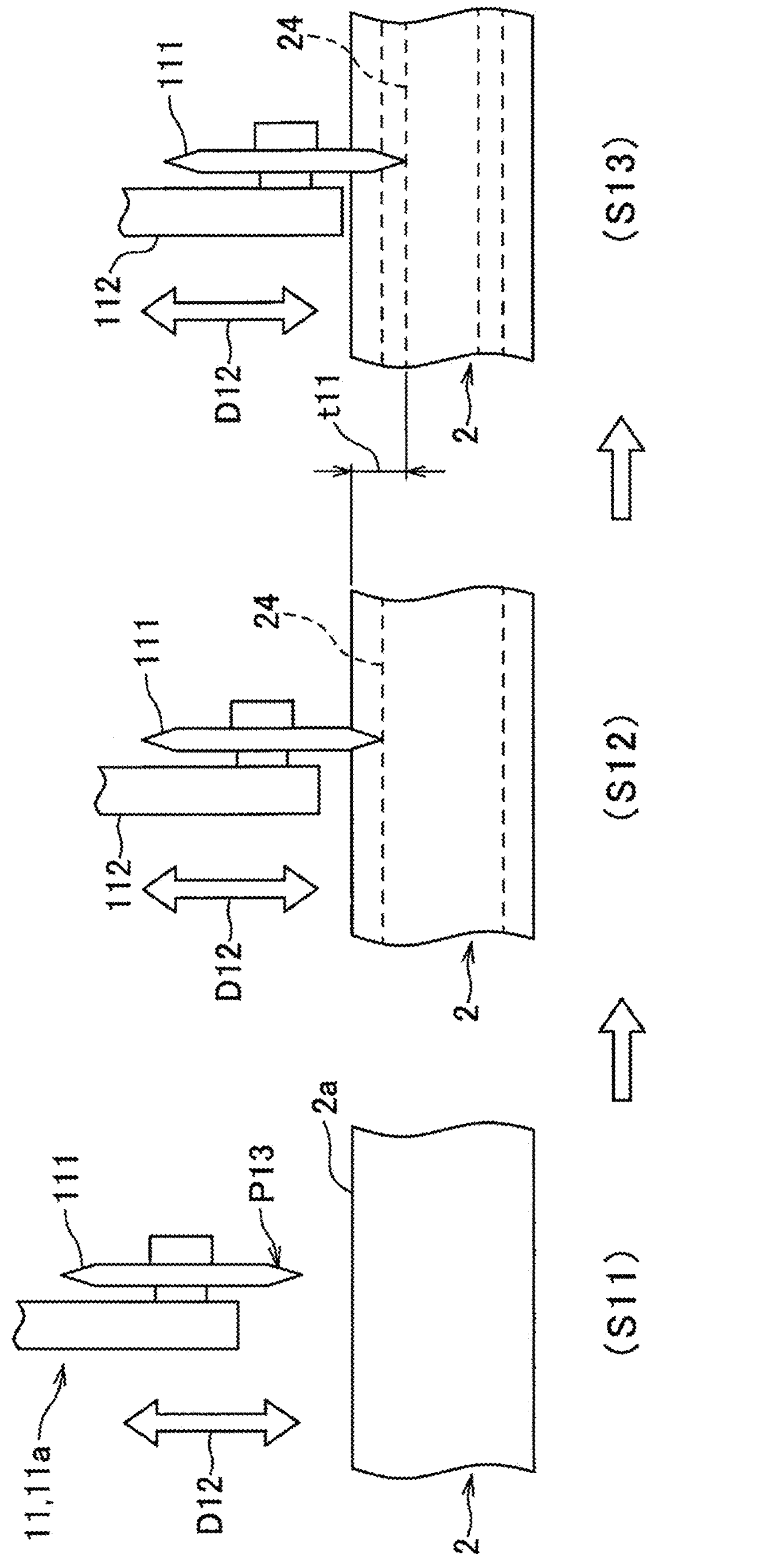
FIG. 9 shows an explanatory view for explanation of some of the processes of the method for forming a notch for stripping according to FIG. 8 by means of a peripheral structure around the cutter blades as shown in the side view of FIG. 4.

FIG. 8 shows a schematic flowchart illustrating a flow of a series of processes of a method for forming a notch for stripping at a terminal of the coated electric wire by means of the device for forming a notch for stripping as shown in FIG. 1. FIG. 9 shows an explanatory view for explanation of some of the processes of the method for forming a notch for stripping according to FIG. 8 by means of a peripheral structure around the cutter blades as shown in the side view of FIG. 4.

The process of the method for forming a notch for stripping according to FIG. 8 is started when the coated electric wire 2 is prepared in which a notch is formed. When the series of processes is started, a preparation step S11 is first performed. At the preparation step S11, the coated electric wire 2 is placed in the device 1, and in each of the mechanism parts 11*a* of the three cutting mechanisms 11, the cutter blade 111 is positioned in an initial position P13, wherein the initial position P13 is spaced away from the outer circumferential surface 2*a* in the intersection direction D12. At this time, the coated electric wire 2 is placed in the device 1 by holding the coated electric wire 2 with the clamping part 13.

The preparation step S11 is followed by a first notch forming step S12 in which the cutter blades 111 are moved in the intersection direction D12 by the movement mechanism 112 as described below. During the first notch forming step S12, a cutter movement step S121 and a contact determination step S122 are repeated, wherein the contact determination step S122 is carried out based on the variable capacitance of the cutter-side capacitor C2. At the contact determination step S122, the contact detecting section 113 determines whether or not the variable capacitance of the cutter-side capacitor C2 is zero. If the variable capacitance is not zero (NO-determination), this indicates that the cutter blade 111 is not in contact with the metal foil 24 as the outermost conductor, wherein the cutter movement step S121 is therefore repeated. If the variable capacitance is zero (YES-determination), this indicates that the cutter blade 111 is in contact with the metal foil 24, wherein the process therefore proceeds to a next step, i.e., a second notch forming step S13.

After the contact between the cutter blade 111 and the metal foil 24 is detected by the contact detecting section 113, the position of the cutter blade 111 in the intersection direction D12 is adjusted by the movement mechanism 112 at the second notch forming step S13. With this position adjustment, the cutter blade 111 is positioned in a position corresponding to the specified notch depth t11 to form a notch. In the case of the specified notch depth extending to the metal foil 24, movement of the cutter blade 111 is stopped at the time of detecting the contact, as described above. On the other hand, in the case of the specified notch depth extending to the braid 23, movement of the cutter blade 111 is stopped when the cutter blade 111 has been forwarded over a distance corresponding a thickness of the metal foil 24 after the time of detecting the contact. After the contact between the cutter blade 111 and the metal foil 24 has been detected, the above-described position adjustment of the cutter blade 111 is performed at the second notch forming step S13 for forming a notch.

After the second notch forming step S13 has been performed for each of the three cutting mechanisms 11, the notches are finally extended according to a rotation step S14. At the rotation step S14, the mechanism parts 11*a* of the three cutting mechanisms 11 are rotated by an angle greater than or equal to 120° around the electric wire axis 2*b* by the rotation mechanism 12 in a state of the mechanism parts 11*a* which have formed the notches in the coated electric wire 2. With this rotation, the notches at the three locations are extended in the direction around the electric wire axis 2*b* to be connected to each other so that at a terminal of the coated electric wire 2, one notch is formed which extends over the entire circumference of the coated electric wire 2 in the direction around the electric wire axis 2*b*. Forming this notch over the entire circumference makes the stripped region corresponding to the specified notch depth t11 removable, wherein the series of processes of the method for forming a notch for stripping is ended here. After this, the removable stripped region is removed to expose an inner portion thereof. The stripped region may be removed manually by an operator, or may be removed by using a dedicated removal device.

The device 1 and method for forming a notch for stripping according to the above-described embodiment may have one or more effects as follows: According to the present embodiment, for forming one or more notches for stripping by the cutter blade 111, the contact between the metal foil 24 (outermost conductor) and the cutter blade 111 is detected based on the variable capacitance of the cutter-side capacitor C2 between the metal foil 24 and the cutter blade 111. After the detection, the position of the cutter blade 111 is adjusted to position the cutter blade 111 to a position corresponding to the specified notch depth t11 for forming one or more notches at the notch depth t11. According to this configuration, the cutter blade 111 is subsequently forwarded starting from a position as a reference in which the cutter blade 111 has actually come into contact with the metal foil 24 of the coated electric wire 2. By defining the reference for forwarding as described above, it is possible to suppress impact of accumulated thickness tolerances for individual coating materials and to thus improve the accuracy for notch forming, even for forming a notch in a thick electric wire. Furthermore, even for a coated electric wire 2 with deformation and/or misalignment which is caused by winding and storing it around a bobbin, impact of the deformation and/or alignment may be suppressed to improve the accuracy for notch forming because the cutter blade 111 is forwarded after actually bringing the cutter blade 111 into contact with the metal foil 24. In this manner, the present embodiment may enable the accuracy for notch forming to be improved in the case of forming a notch in a thick electric wire and/or a coated electric wire 2 wound around a bobbin for storage. Furthermore, for a thick electric wire, the specified notch depth t11 may be variably selected as appropriate according to the present embodiment, which allows one or more notches to be formed to a desired coating material without changing a device structure, wherein the desired coating material may be selected within a wide range.

According to the present embodiment, the electrically conductive clamping part 13 is provided which is configured to hold the coated electric wire 2 in the clamping position P12, wherein the clamping position P12 is spaced away from the notch forming position P11 of the cutter blade 111. The contact detecting section 113 is configured to detect the variable capacitance of the cutter-side capacitor C2 by applying a voltage to the electric circuit CR1, wherein the electric circuit CR1 includes the fixed capacitance of the clamping-side capacitor C1, the variable capacitance, and the metal foil 24. Furthermore, the contact detecting section 113 detects the contact between the cutter blade 111 and the metal foil 24 based on the detection result of the variable capacitance. This configuration is preferable because it may allow the variable capacitance based on the cutter blade 111 to be effectively detected with the electric circuit CR1 formed by the fixed capacitance based on the electrically conductive clamping part 13, the variable capacitance, and the metal foil 24 of the coated electric wire 2.

Furthermore, according to the present embodiment, the movement mechanism 112 includes the servo motor 112*a* and is configured to move the cutter blade 111 by means of the servo motor 112*a*. This configuration may enable the accuracy for notch forming to be further improved by precisely moving the cutter blade 111 with the servo motor 112*a*.

It is to be noted that the embodiment as described above merely shows representative configurations for the device and method for forming a notch for stripping. The device and method for forming a notch for stripping are not limited thereto, but may be modified and implemented in various manners.

For example, the above-described embodiment shows the coated electric wire 2 to be used e.g. for a high-voltage wire harness for an automobile as an example of a coated electric wire in which a notch for stripping is formed. However, the coated electric wire to which notch forming is applied is not limited thereto, but the coated electric wire may be used in any specific manner.

As an example of a coated electric wire in which a notch for stripping is formed, the above-described embodiment further shows the coated electric wire 2 in the form of a thick electric wire including the conductive core 21 covered with the plurality of layers of coating materials. As examples of the plurality of layers of coating materials as mentioned above, the present embodiment shows the inner coating 22 of an insulating resin, the conductive braid 23, the conductive metal foil 24, and the outermost coating 25 of an insulating resin. However, the coated electric wire for which notch forming is applied is not limited thereto, but may include a core covered with a single layer of a resin coating, and e.g. any specific layer structure may be used for the plurality of layers of coating materials, even for a thick electric wire. In the case of a simple coated electric wire including the core covered with a single layer of a resin coating, the core is the outermost conductor at the smallest depth from the outer circumferential surface.

As an example of the cutting mechanism, the above-described embodiment shows the three cutting mechanisms 11 including the three mechanism parts 11*a* in a one-to-one manner, i.e., with one of the mechanism parts 11*a* being associated to each of the cutting mechanisms 11, wherein the mechanism parts 11*a* are arranged around the electric wire axis 2*b* of the coated electric wire 2 at an interval of an angle of 120°. However, the cutting mechanism is not limited thereto, but any specific number of cutting mechanisms and any specific arrangement may be selected for the cutting mechanism, provided that one or more mechanism parts are arranged around the electric wire axis of the coated electric wire.

As an example of the device for forming a notch for stripping, the above-described embodiment further shows the device 1 for forming a notch for stripping which holds the coated electric wire 2 by means of the electrically conductive clamping part 13. The contact detecting section 113 detects the contact between the cutter blade 111 and the metal foil 24 based on the detection result of the variable capacitance of the cutter-side capacitor C2 in the electric circuit CR1, wherein the electric circuit CR1 includes the fixed capacitance of the clamping-side capacitor C1, the variable capacitance, and the metal foil 24. However, the device for forming a notch for stripping is not limited thereto, but any specific implementation for holding the coated electric wire may be selected, and any specific implementation for detection of contact between the cutter blade and the outermost conductor may be also selected. However, the variable capacitance of the cutter-side capacitor C2 may be effectively detected by using the electric circuit CR1 including the fixed capacitance of the clamping-side capacitor C1 via holding the coated electric wire 2 with the electrically conductive clamping part 13, as described above.

As an example of the clamping part, the above-described embodiment further shows the clamping part 13 which holds the coated electric wire by clamping it between the pair of clamping elements 131. However, the clamping part is not limited thereto, but any specific implementation for holding may be selected, provided that the clamping part is electrically conductive and holds the coated electric wire.

As an example of the movement mechanism, the above-described embodiment further shows the movement mechanism 112 which moves the cutter blade 111 by means of the servo motor 112*a*. However, the movement mechanism is not limited thereto, but e.g. a motor or cylinder mechanism which is commonly used as a driving source may be selected. However, the accuracy for notch forming may be further improved by using the servo motor 112*a* as a driving source for the movement mechanism 112, as described above.

REFERENCE SIGNS LIST

1 Device for forming a notch for stripping
2 Coated electric wire
2*a* Outer circumferential surface
2*b* Electric wire axis
11 Cutting mechanisms
11*a* Mechanism parts
12 Rotation mechanism
13 Clamping part
21 Core
22 Inner coating
23 Braid
24 Metal foil
25 Outermost coating
111 Cutter blades
111*a* Cutter axis
112 Movement mechanism
112*a* Servo motor
112*b* Cutter coupling frame
113 Contact detecting section
113*a* IN-terminal
113*b* OUT-terminal
131 Clamping elements
131*a* Electric wire receiving recesses
C1 Clamping-side capacitor
C2 Cutter-side capacitor
CR1 Electric circuit
D11 Cutting rotating direction
D12 Intersection direction
D13 Length direction
D14 Radial direction
P11 Notch forming position
P12 Clamping position
P13 Initial position
S11 Preparation step
S12 First notch forming step
S13 Second notch forming step
S14 Rotation step
S121 Cutter movement step
S122 Contact determination step
t11 Notch depth

What is claimed is:

1. A device for forming a notch for stripping, comprising:
a plurality of cutting mechanisms including a plurality of mechanism parts, with one of the plurality of mechanism parts being associated to each of the plurality of cutting mechanisms, wherein the plurality of cutting mechanisms are configured to be arranged around an electric wire axis of a coated electric wire, wherein the coated electric wire includes a core covered with an insulating layer or covered with the insulating layer and one conductive layer or a plurality of conductive layers, wherein the one conductive layer or the plurality of conductive layers are layered inside the insulating layer, wherein each of the plurality of cutting mechanisms is configured to form one or more notches in the coated electric wire to a specified notch depth starting from an outer circumferential surface of the coated electric wire by means of a respective one of the plurality of mechanism parts,
wherein each of the plurality of cutting mechanisms includes:
an electrically conductive cutter blade which is movable in an intersection direction intersecting the outer circumferential surface;
a contact detecting section including an in-terminal and an out-terminal configured to form an electric circuit to detect a contact between an outermost conductor of the coated electric wire and the cutter blade based on a variable capacitance between the outermost conductor and the cutter blade,
wherein the outermost conductor is one of the core, the one conductive layer, or a conductive layer of the plurality of conductive layers located closest to the outer circumferential surface in the coated electric wire,
wherein the variable capacitance depends on movement of the cutter blade; and
a movement mechanism configured to move the cutter blade in the intersection direction, wherein upon detecting the contact by the contact detecting section during movement of the cutter blade, the movement mechanism is configured to adjust a position of the cutter blade in the intersection direction and position the cutter blade to a position corresponding to the notch depth for forming one or more notches therein,
wherein each mechanism part associated with a respective cutting mechanism is formed by a pair of one movement mechanism and one cutter blade,
wherein the plurality of mechanism parts of the plurality of cutting mechanisms are configured to be arranged around the electric wire axis, and
wherein the device further comprises:
a rotation mechanism configured to rotate the plurality of mechanism parts of the plurality of cutting mechanisms around the electric wire axis and thus extend a plurality of notches in a direction around the electric wire axis in a state of the plurality of cutting mechanisms which have formed the plurality of notches in the coated electric wire, which makes a stripped region corresponding to the notch depth removable.

2. The device according to claim 1, further comprising:
an electrically conductive clamping part configured to hold the coated electric wire by contacting the outer circumferential surface in a clamping position, wherein the clamping position is spaced away from a notch forming position of the cutter blade in a length direction of the coated electric wire,
wherein the contact detecting section is configured to apply a voltage to the electric circuit by using the clamping part and the cutter blade as electrodes to detect the variable capacitance, the electric circuit including a fixed capacitance between the clamping part and the outermost conductor, the variable capacitance and the outermost conductor, wherein based on a detection result of the variable capacitance, the contact detecting section is configured to detect the contact.

3. The device according to claim 2, wherein each of the plurality of cutting mechanisms includes the clamping part, wherein the clamping part is connected to the in-terminal of the contact detecting section of each of the plurality of cutting mechanisms, and wherein the cutter blade is connected to the out-terminal of the contact detecting section of each of the plurality of cutting mechanisms.

4. The device according to claim 1, wherein the movement mechanism includes a servo motor, and wherein the movement mechanism is configured to move the cutter blade by means of the servo motor.

5. The device according to claim 1, wherein the notch depth is provided as a depth between the outer circumferential surface and the outermost conductor, or as a depth deeper than the outermost conductor, wherein, when the notch depth is provided as the depth between the outer circumferential surface and the outermost conductor, the movement mechanism is configured to stop movement of the cutter blade at a time of detecting the contact by the contact detecting section, and wherein, when the notch depth is provided as the depth deeper than the outermost conductor, the movement mechanism is configured to stop movement of the cutter blade after further moving the cutter blade into the coated electric wire after the time of detecting the contact by the contact detecting section.

6. A method for forming a notch for stripping comprising:

a preparation step of placing the coated electric wire in the device according to claim 1 and positioning each of a plurality of cutter blades in an initial position by means of the device, wherein the initial position is spaced away from the outer circumferential surface in the intersection direction;

a first notch forming step of moving each of the plurality of cutter blades until the contact between the outermost conductor and each cutter blade is detected by each contact detecting section based on the variable capacitance;

upon detecting the contact by each contact detecting section during movement of each of the plurality of cutter blades according to the first notch forming step, a second notch forming step of adjusting the position of each of the plurality of cutter blades in the intersection direction and positioning each of the plurality of cutter blades to a position corresponding to the notch depth for forming one or more notches therein; and a rotation step of rotating the plurality of mechanism parts around the electric wire axis and thus extending the plurality of notches in the direction around the electric wire axis in the state of the plurality of mechanism parts which have formed the plurality of notches in the coated electric wire, which makes the stripped region corresponding to the notch depth removable.

* * * * *